(12) United States Patent
Niederriter et al.

(10) Patent No.: US 8,439,451 B2
(45) Date of Patent: *May 14, 2013

(54) COOLING A RANGING ARM GEAR CASE ON A LONGWALL SHEARER

(75) Inventors: Edward F. Niederriter, Fryburg, PA (US); Shawn W. Franklin, Emlenton, PA (US); Philip R. Strydom, Franklin, PA (US)

(73) Assignee: Joy MM Delaware, Inc., Wilmington, DE (US)

( * ) Notice: Subject to any disclaimer, the term of this patent is extended or adjusted under 35 U.S.C. 154(b) by 1020 days.

This patent is subject to a terminal disclaimer.

(21) Appl. No.: 12/475,456

(22) Filed: May 29, 2009

(65) Prior Publication Data
US 2010/0301660 A1 Dec. 2, 2010

(51) Int. Cl.
*E21C 25/06* (2006.01)
(52) U.S. Cl.
USPC .......................................... 299/42; 74/606 A
(58) Field of Classification Search .................. 299/42, 299/51–54, 81.1, 81.2, 81.3; 184/6.12; 74/606 A
See application file for complete search history.

(56) References Cited

U.S. PATENT DOCUMENTS

| | | | |
|---|---|---|---|
| 3,666,320 A * | 5/1972 | Lanfermann | 299/53 |
| 4,614,228 A * | 9/1986 | Lenk | 165/89 |
| 4,987,974 A * | 1/1991 | Crouch | 184/6.12 |
| 5,098,166 A | 3/1992 | Ebner et al. | |
| 5,518,299 A | 5/1996 | Adamczyk et al. | |
| 2011/0309669 A1* | 12/2011 | Niederriter et al. | 299/42 |

OTHER PUBLICATIONS

Office Action from the Australian Intellectual Property Office for Application No. 2010201917 dated May 30, 2012 (1 page).
Office Action from the Australian Intellectual Property Office for Application No. 2012200718 dated May 30, 2012 (2 pages).

\* cited by examiner

*Primary Examiner* — Sunil Singh
(74) *Attorney, Agent, or Firm* — Michael Best & Friedrich LLP

(57) ABSTRACT

A cooling system for the gear case in the ranging arm of a longwall shearer, the ranging arm including a plurality of single gears mounted in a row within an elongated housing. The cooling system includes a coolant injection system in each of the single gears, each coolant injection system including a longitudinal opening in the gear axle, and a coolant injection tube mounted inside the longitudinal opening. The coolant injection tube has a diameter smaller than the diameter of the longitudinal opening. A coolant supply line is connected to and in communication with the coolant injection tube, and a coolant outlet is connected to and in communication with the longitudinal opening adjacent the one end of the longitudinal opening, so that coolant leaving the end of the coolant injection tube travels back along the coolant injection tube and then out of the gear axle thereby removing heat from the single gear.

14 Claims, 5 Drawing Sheets

COOLING A RANGING ARM GEAR CASE ON A LONGWALL SHEARER

BACKGROUND

This disclosure relates to a machine including a compact, high power density gear case for transmitting rotational power from a drive to a driven member, and, more particularly, to such a gear case including an improved cooling system.

A variety of different apparatuses exist for mining coal and other materials from underground seams. One apparatus that is commonly used in underground mining operations comprises a continuous mining machine used in instances where extended portions or longwalls of seam are desired to be mined. Such longwalls may, depending upon the seam configuration, extend for distances of 300-1200 feet. It is standard practice in this type of mining to mine parallel entries into the seam to be mined and connect those entries with one or more primary passages. Such arrangement defines the longwall pillar(s) to be mined. The roof of the primary passages is usually supported by movable roof supports during the mining of the exposed "face" of the longwall pillar.

Conventional longwall mining techniques employ a mining machine that is known in the industry as a longwall shearer. A longwall shearer typically has an elongated mobile frame that is supported on floor-mounted tracks that are adjacent and substantially parallel to the mine face. Rotary driven toothed drums are operably supported on arms on each end of the elongated frame for winning the coal as the frame passes back and forth before the mine face. The won material falls into a face conveyor that is usually attached to the floor-mounted tracks and extends parallel to the longwall face. The face conveyor discharges the material onto other conveying apparatuses to transport the material from the seam. As the mine face recedes, the conveyor and track assembly is advanced forward to enable the shearer to continue mining.

As shown in FIG. 1, a longwall shearer mining machine 10 has an elongated mobile frame 12 that is movably supported on a conveyor/track way 14 that is substantially parallel with the longwall face 15. A laterally extending rotary drum 18 which has a plurality of mining bits 19 attached thereto is pivotally attached to each end of the elongated mobile frame 12 by a corresponding ranging arm 16. The operation of the shearer 10 is well known in the mining art and, as such, will not be discussed in detail herein. However, the skilled artisan will appreciate that the shearer 10 is moved back and forth on the track way 14 such that the mining bits 19 on the rotating drums 18 can be brought into engagement with the mine face 15 to dislodge material there from. As the face recedes, the track way 14 and shearer 10 are advanced towards the face 15 to enable the mining process to be continued.

Gear cases used in the ranging arms of longwall shearers are required to be very power dense. This is because the theoretical output of a mining machine is proportional to its installed power, while the operating envelope in a mine requires the package to be as small as possible. The heat generated in these powerful gear cases must be removed on a continuous basis to promote long-term reliability.

Longwall shearer ranging arm gear cases are specialized in nature. They are required to be as compact as possible while being capable of reliably transmitting rotational power to the shearer cutting drum. As with many gear cases with high power density, heat is generated from the losses in the rolling elements and the windage energy of the lubricant. In order to prevent the gear case from overheating and damaging the lubricant, seals and other components, it is common to incorporate some method of cooling the unit.

Further, ranging arm gear cases are required to have a specific shape to make them long enough to extend between the input motor and the output shaft. Owing to this characteristic, they usually have a number of single gears, known as reach gears, mounted in a row (usually 2 to 5) to space the input and output shafts apart. A substantial portion of the heat in the gear case is produced as each of these gears churns at high speeds in the lubrication oil around the gears. Additionally, the friction of their rolling element bearing further contributes to the heat making.

Conventional ranging arm gear case designs utilize either a separate water-cooled heat exchanger that is mounted in the oil reservoir, or a heat exchanger built into the housing of the gear case.

Both of these methods require the gear case to be moderately larger in size and of increased cost of manufacture. In both cases there is also a risk of contamination of the internal lubricating oil with water from a leak in the heat exchanger or water and dirt ingress from the environment due to the required openings in the housing to bring the water into and out of the unit.

SUMMARY

This disclosure proposes to take make use of an underutilized volume in the gear case; the reach-gear mounting axles. These mounting axles are located in the center of each of the 2 to 5 reach gears and are used to rigidly support the gears. The diameter of these axles is of a diameter large enough to fit the required bearing size internal to the reach gear and also large enough to reliably support the forces that are transmitted from the gear through the bearings to the axle and then to the housing.

This disclosure involves the adding of drillings to the gear mounting axles in the ranging arm. Water can then be transmitted through these axles removing heat very near the source, with very little additional complexity.

The significance of this disclosure is that it is an efficient low cost method to achieving heat removal from the gear case without increasing its size. Normally, when heat exchangers are added, either internally or integrally to the housing, they require that the overall package become larger. Since the gear axles are pre-existing, adding a cooler to the center does not increase its overall package size. The centers of these gear axles are not normally utilized, so no compromises are required to fit this feature into the gear case.

This design uses each of these shafts as individual heat exchangers. Each axle is drilled to accept a flow of coolant. This allows the removal of the heat very near its source. The advantages of this design are:

1. The cooling method requires no increase in volume for the gear case.
2. It is very inexpensive to drill these axles during their normal manufacturing process.
3. There is no chance of water ingress into the lubricating oil because the axles are made of impervious material and the water is not connected through the wall of the gear case housing.
4. No special provisions are required to supply coolant to the axles because in conventional ranging arm designs, they are mounted at the edge of a hose trough.
5. They are efficient heat exchangers because they are mounted near the source of the heat.

This disclosure thus provides a cooling system for the gear case in the ranging arm of a longwall shearer, the ranging arm including a plurality of single gears mounted in a row within an elongated housing. The cooling system includes a coolant injection system in each of the single gears, each coolant injection system including a longitudinal opening in the gear axle, and a coolant injection tube mounted inside the longitudinal opening. The coolant injection tube has a diameter smaller than the diameter of the longitudinal opening. A coolant supply line is connected to and in communication with the coolant injection tube, and a coolant outlet is connected to and in communication with the longitudinal opening adjacent the one end of the longitudinal opening, so that coolant leaving the end of the coolant injection tube travels back along the coolant injection tube and then out of the gear axle thereby removing heat from the single gear.

Figure 1:
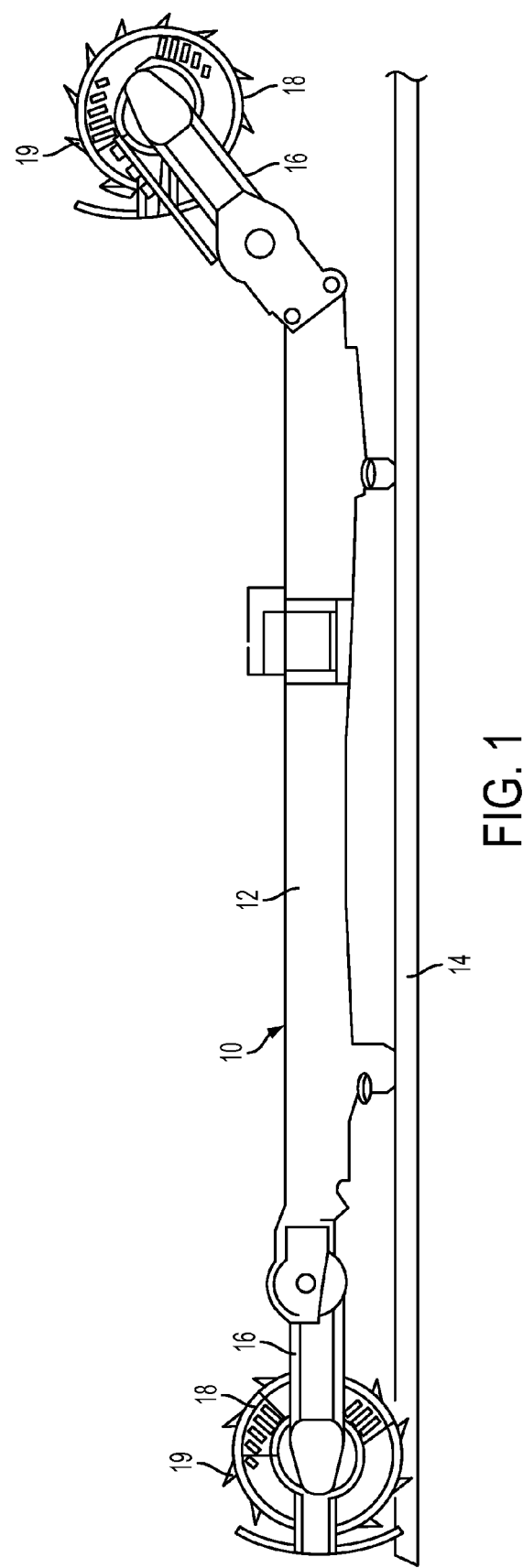
FIG. 1 is a plan view of a longwall shearer including a ranging arm.

Before one embodiment of the disclosure is explained in detail, it is to be understood that the disclosure is not limited in its application to the details of the construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience and are not to be construed as limiting terms.

DESCRIPTION OF THE PREFERRED EMBODIMENT

Figure 2:
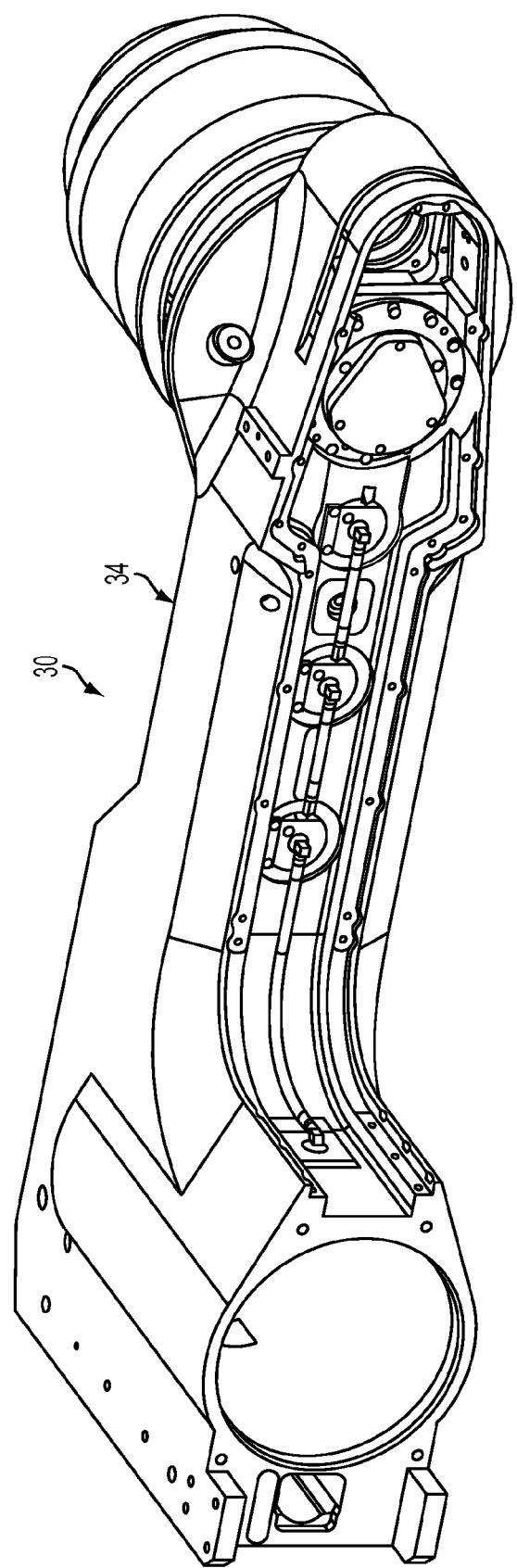
FIG. 2 is an enlarged perspective view of a longwall shearer ranging arm gear case in accordance with this disclosure.
Figure 3:
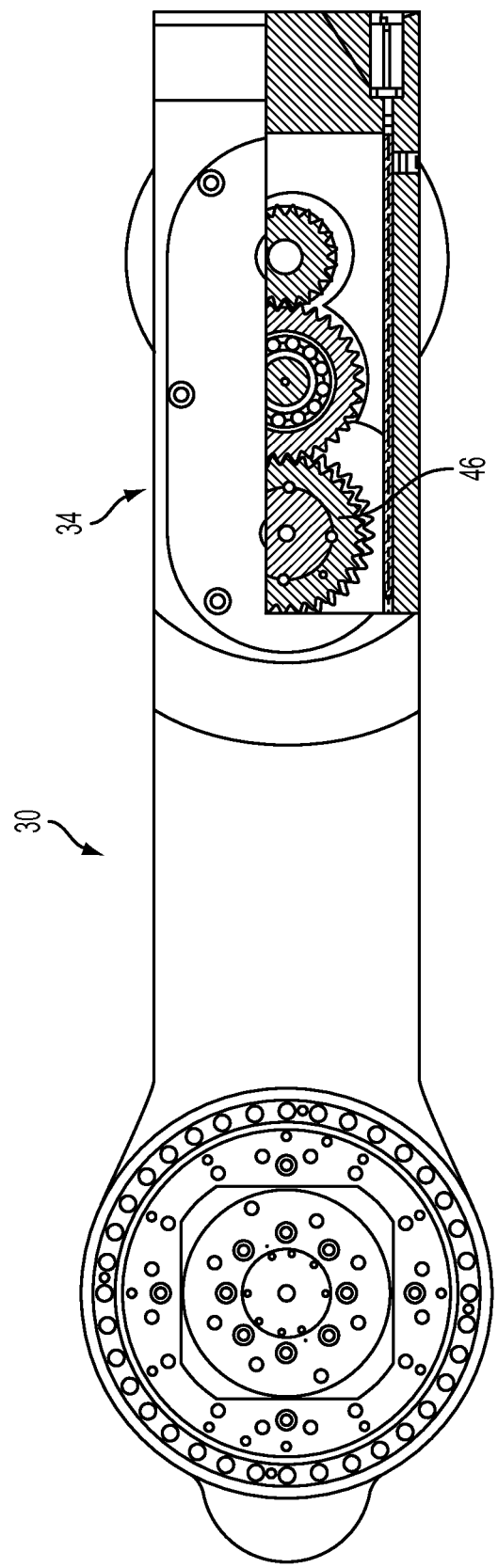
FIG. 3 is side view, partially broken away, of the ranging arm gear case shown in FIG. 2, with a portion broken away to show single gears mounted in a row inside the gear case.

The preferred embodiment relates to an improvement to the ranging arm 16 shown in FIG. 1. More particularly, an improved ranging arm 30 is shown in FIGS. 2 through 4.

Figure 4:
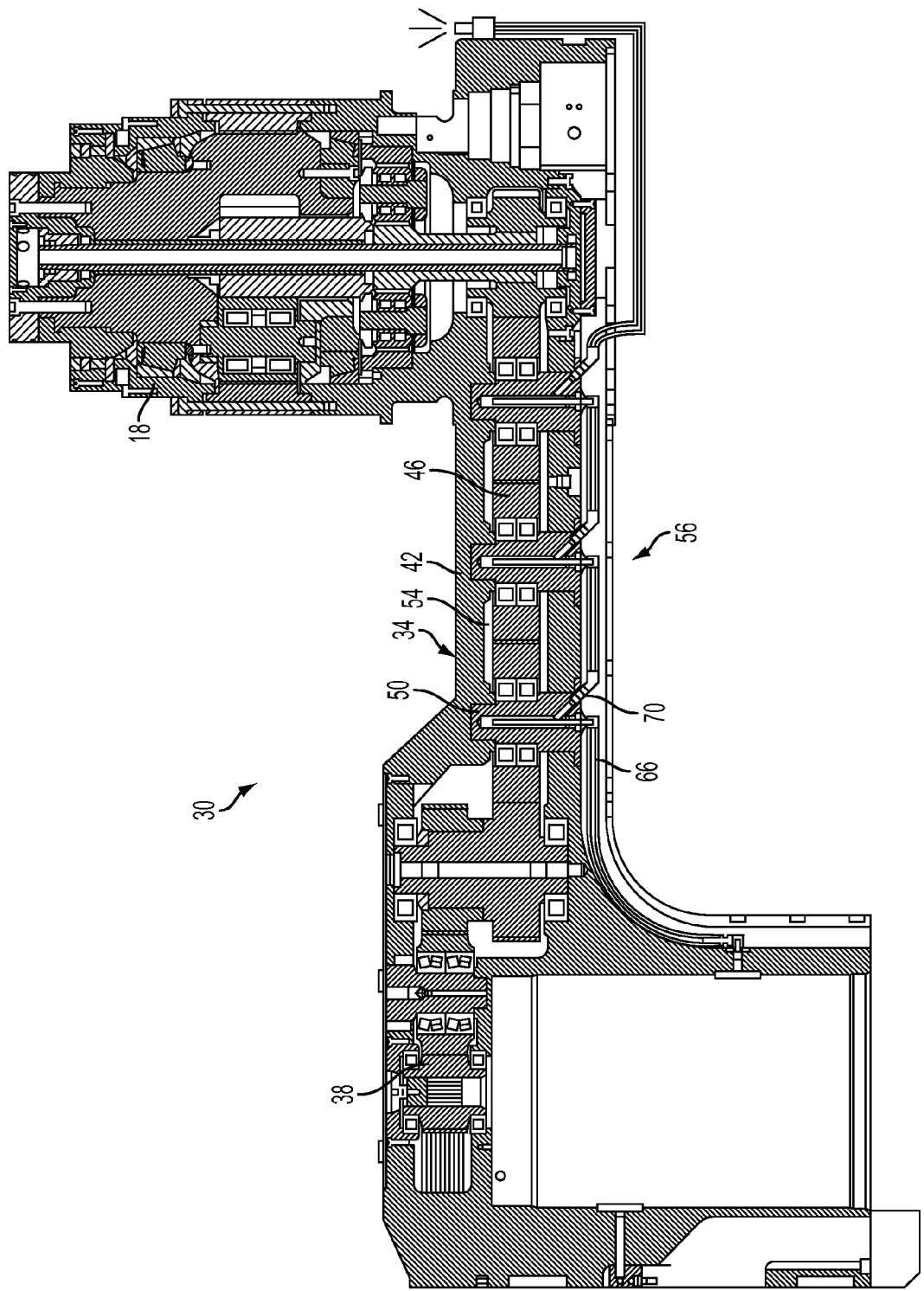
FIG. 4 is a top section view of the longwall shearer ranging arm gear case.

As shown in FIG. 4, the disclosed longwall shearer ranging arm 30 includes a gear case 34 for transmitting rotational power from a drive 38 to the rotary driven toothed drum 18. The gear case 34 includes an elongated housing 42, and a plurality of single gears 46 mounted in a row within the elongated housing 42. One gear at one end of the row is drivingly connected to the drive 38, and another gear at another end of the row is drivingly connected to the driven member, which is the drum 18. Each single gear mounting is in the form of a longitudinal gear axle 50 having a mounting axis extending longitudinally along the gear axle 50, and lubricating oil 54 surrounding the single gears 46 and contained within the housing 42.

Figure 5:
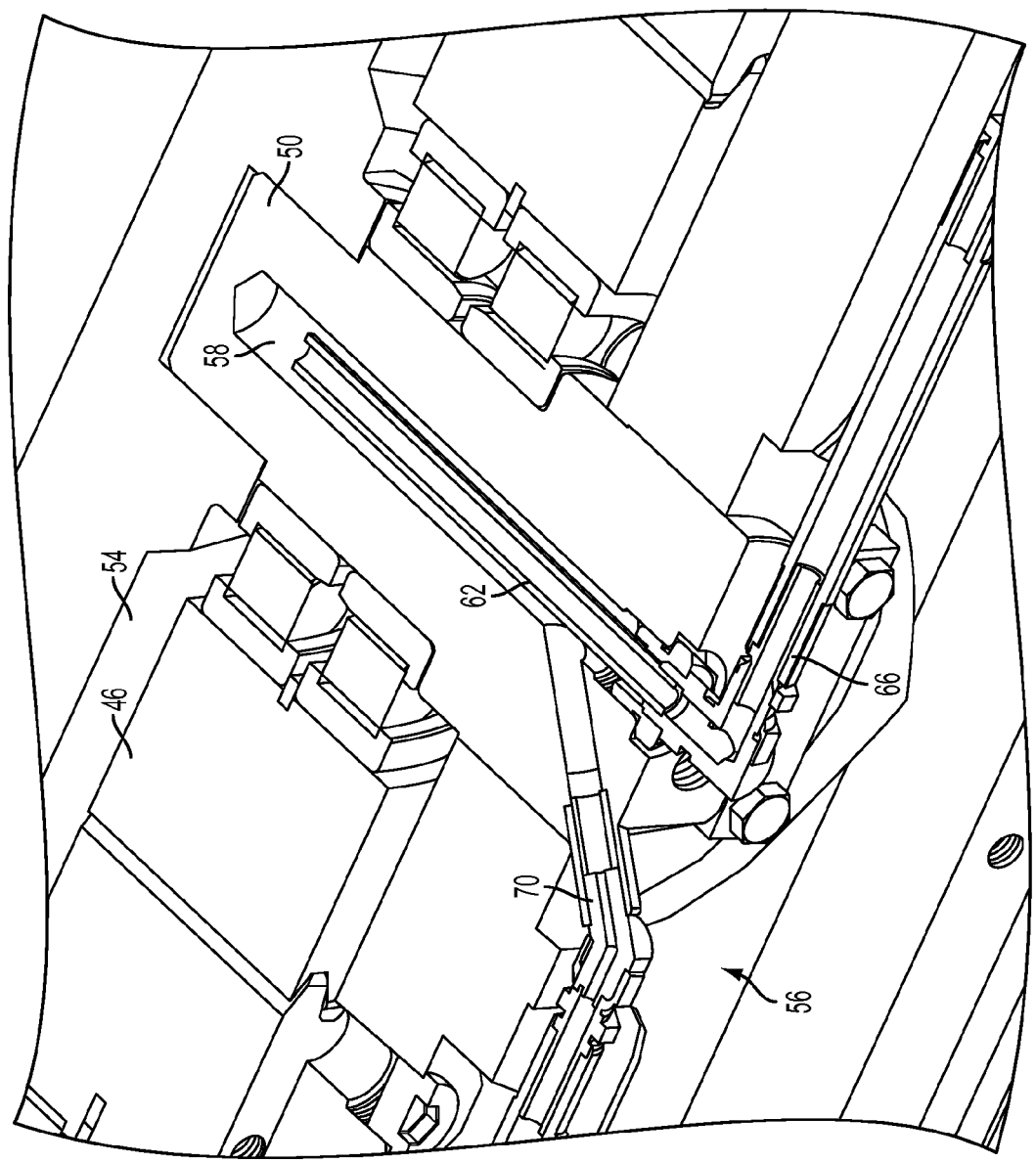
FIG. 5 is an enlarged sectional view of one of the single gears shown in FIGS. 3 and 4.

This disclosure presents a new cooling system for the gear case 34, the cooling system including a coolant injection system 56 in each of the single gears 46. As shown in FIGS. 4 and 5, each coolant injection system 56 includes a longitudinal opening 58 (see FIG. 5), such as by drilling, in the gear axle 50, extending a substantial distance along the mounting axis, and a coolant injection tube 62 mounted inside the longitudinal opening 58, extending a substantial distance from one end of the longitudinal opening 58 inside the longitudinal opening 58. The coolant injection tube 62 has a diameter smaller than the diameter of the longitudinal opening 58. A coolant supply line 66 is connected to and in communication with the coolant injection tube 62, and a coolant outlet 70 is connected to and in communication with the longitudinal opening 58 adjacent the one end of the longitudinal opening having the injection tube 62 mounted therein, so that coolant leaving the end of the coolant injection tube 62 travels back along the coolant injection tube 62 and then out of the gear axle 50, thereby removing heat from the single gear 46.

More particularly, in the illustrated embodiment, the mounting axis is in the center of the gear axle 50, and the longitudinal opening 58 has a constant diameter along its length, and the coolant injection tube has a constant diameter. In other embodiments (not shown), the longitudinal opening, as well as the coolant injection tube, could have varying diameters along their length.

More particularly, in the illustrated embodiment, the plurality of single gears consists of three gears (see FIGS. 2, 3 and 4), and all three gears include a coolant injection system. In other embodiments (not shown), the gear case may include only two gears, both of which include a coolant injection system, or three gears or more gears, at least two of which include a coolant injection system.

The supply of coolant communicates with the coolant supply line of one of the single gears, and the one of the single gears coolant outlet communicates with the next adjacent coolant supply line. The coolant from the coolant outlet is then discharged at a nozzle 74 adjacent the rotary driven toothed drum 18.

Various other features of this disclosure are set forth in the following claims.

The invention claimed is:

1. A machine including a gear case for transmitting rotational power from a drive to a driven member, said gear case including an elongated housing,
    a plurality of single gears mounted in a row within said elongated housing, with one gear at one end of the row being drivingly connected to the drive, and another gear at another end of the row being drivingly connected to the driven member,
    each single gear mounting including a longitudinal gear axle having a mounting axis extending longitudinally along said gear axle,
    lubricating oil surrounding said single gears and contained within said housing, and
    a cooling system for said gear case, said cooling system including a coolant injection system in each of said single gears, each coolant injection system including
    a longitudinal opening in said gear axle, extending a substantial distance along said mounting axis,
    a coolant injection tube mounted inside said longitudinal opening, extending a substantial distance from one end of said longitudinal opening inside said longitudinal opening, said coolant injection tube having a diameter smaller than the diameter of said longitudinal opening, a coolant supply line connected to and in communication with said coolant injection tube, and a coolant outlet connected to and in communication with said longitudinal opening adjacent said one end of said longitudinal opening, so that a coolant leaving the end of the coolant injection tube travels back along the coolant injection tube and then out of the gear axle thereby removing heat from the single gear, wherein, coolant exiting the coolant outlet of a first single gear flows into the coolant injection tube of a second single gear.

2. A machine in accordance with claim 1 wherein said plurality of single gears consists of three gears, and all three gears include a coolant injection system.

3. A machine in accordance with claim 1 wherein a supply of coolant communicates with a coolant supply line of one of said single gears, and wherein said one of said single gears coolant outlet communicates with the next adjacent coolant supply line.

4. A machine in accordance with claim 1 wherein a coolant from said coolant outlet is discharged adjacent a rotary driven toothed drum.

5. A machine in accordance with claim 1 wherein said mounting axis is in the center of said gear axle.

6. A machine in accordance with claim 1 wherein said longitudinal opening has a constant diameter along its length.

7. A machine in accordance with claim 1 wherein said coolant injection tube has a constant diameter along its length.

8. A longwall shearer including a floor-mounted track, an elongated mobile frame supported on said floor-mounted track, arms on each end of the elongated frame, and rotary driven toothed drums, each of which is operably supported on one of said arms for winning mining material as said mobile frame passes back and forth along said floor mounted track, wherein each arm includes a gear case for transmitting rotational power from a drive to said rotary driven toothed drum, said gear case including an elongated housing, a plurality of single gears mounted in a row within said elongated housing, with one gear at one end of the row being drivingly connected to the drive, and another gear at another end of the row being drivingly connected to the driven member, each single gear mounting including a longitudinal gear axle having a mounting axis extending longitudinally along said gear axle, lubricating oil surrounding said single gears and contained within said housing, and a cooling system for said gear case, said cooling system including a coolant injection system in each of said single gears, each coolant injection system including a longitudinal opening in said gear axle, extending a substantial distance along said mounting axis, a coolant injection tube mounted inside said longitudinal opening, extending a substantial distance from one end of said longitudinal opening inside said longitudinal opening, said coolant injection tube having a diameter smaller than the diameter of said longitudinal opening, a coolant supply line connected to and in communication with said coolant injection tube, and a coolant outlet connected to and in communication with said longitudinal opening adjacent said one end of said longitudinal opening, so that coolant leaving the end of the coolant injection tube travels back along the coolant injection tube and then out of the gear axle thereby removing heat from the single gear, wherein, coolant exiting the coolant outlet of a first single gear flows into the coolant injection tube of a second single gear.

9. A machine in accordance with claim 8 wherein said plurality of single gears consists of three gears, and all three gears include a coolant injection system.

10. A machine in accordance with claim 8 wherein a supply of coolant communicates with a coolant supply line of one of said single gears, and wherein said one of said single gears coolant outlet communicates with the next adjacent coolant supply line.

11. A machine in accordance with claim 8 wherein a coolant from said coolant outlet is discharged adjacent a rotary driven toothed drum.

12. A machine in accordance with claim 8 wherein said mounting axis is in the center of said gear axle.

13. A machine in accordance with claim 8 wherein said longitudinal opening has a constant diameter along its length.

14. A machine in accordance with claim 8 wherein said coolant injection tube has a constant diameter along its length.

* * * * *